Sept. 8, 1931. A. P. BALL 1,821,957
VEHICLE BODY CONSTRUCTION
Filed Oct. 6, 1930 2 Sheets-Sheet 2
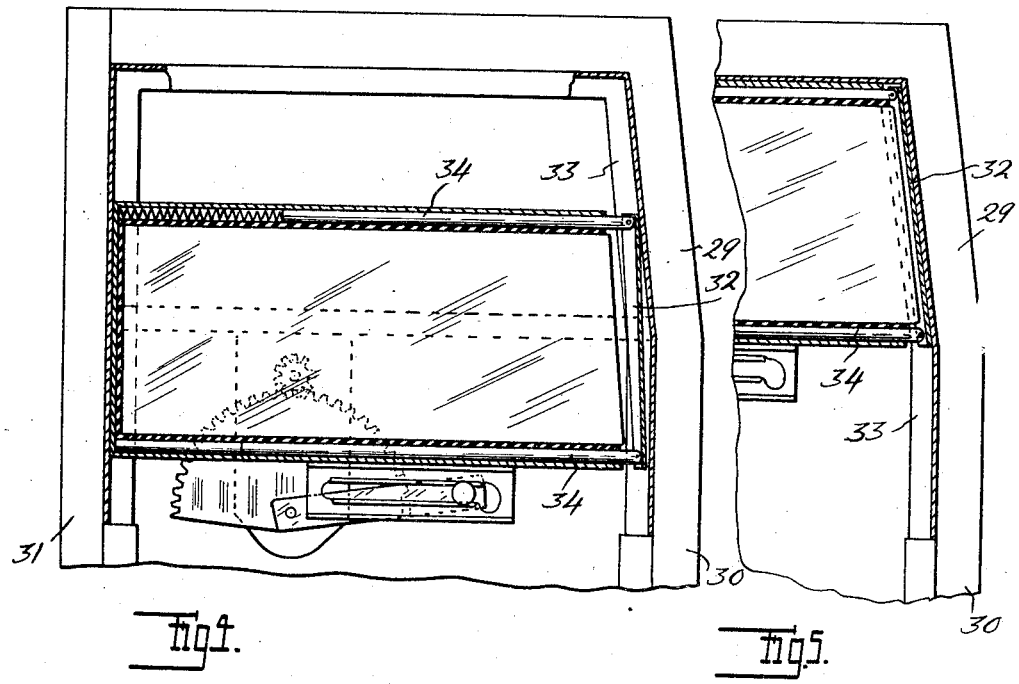
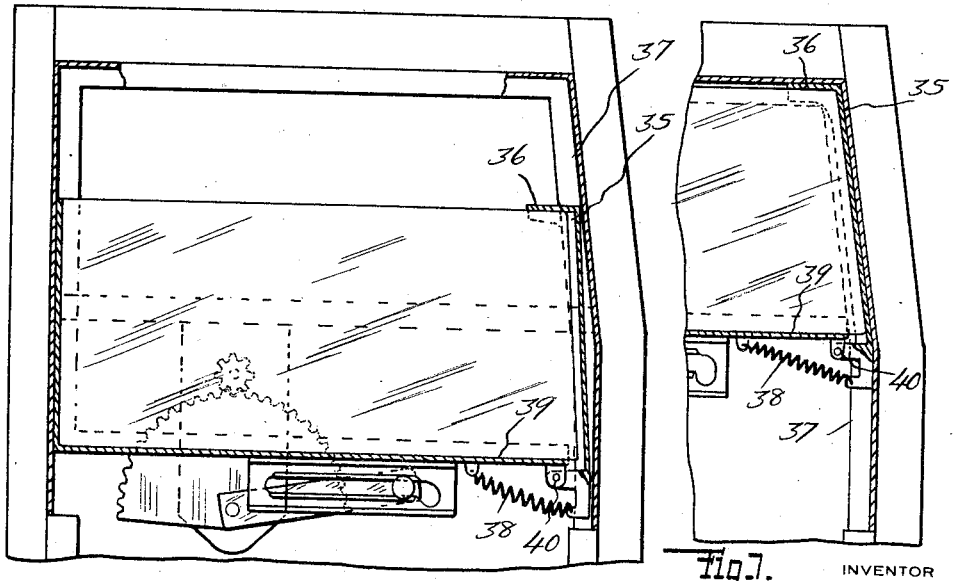
INVENTOR
Albert P. Ball
BY
ATTORNEYS Patented Sept. 8, 1931

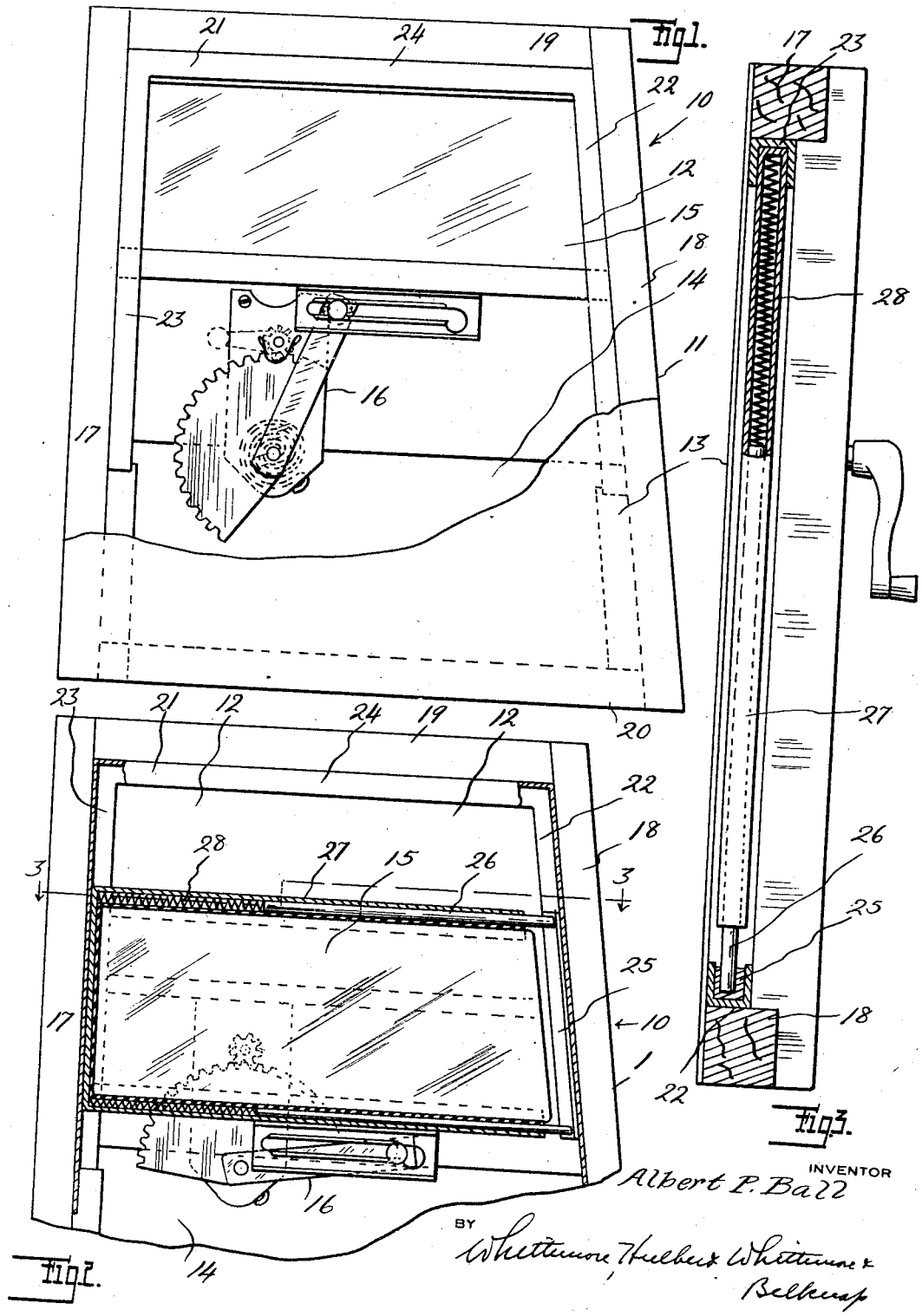

1,821,957

UNITED STATES PATENT OFFICE

ALBERT P. BALL, OF DETROIT, MICHIGAN, ASSIGNOR TO BRIGGS MANUFACTURING COMPANY, OF DETROIT, MICHIGAN, A CORPORATION OF MICHIGAN

VEHICLE BODY CONSTRUCTION

Application filed October 6, 1930. Serial No. 486,827.

This invention relates generally to vehicle bodies and more particularly to window constructions for use in connection with vehicle bodies.

The invention concerns itself still more particularly with that type of vehicle body wherein one side edge of the window opening and the adjacent side edge of the glass closure member are inclined relative to the horizontal and wherein the opposite side edges of the opening and window panel are substantially perpendicular to the horizontal and parallel to the path of travel of the glass panel.

In manufacturing vehicle bodies of the type specified above, considerable difficulty has been experienced in providing an efficient construction since when sliding the glass panel in a perpendicular path, the inclined edge thereof travels away from the adjacent side of the opening and accordingly has a tendency to rattle when the same is in any one of its intermediate adjusted positions.

In an effort to eliminate the foregoing objections certain manufacturers have attempted to slide the glass panel in a path inclined slightly to the perpendicular edges of the opening and panel. The degree of inclination being so determined that the perpendicular edge of the glass panel is prevented from moving out of supporting relation with the adjacent side of the window opening and the inclined front edge of the window panel is maintained to a certain degree in supporting relation with the adjacent side of the window opening. The above method, while successful to a certain degree in supporting the inclined edge of the panel, is impractical in the production of modern priced bodies owing to the complications and expense involved.

Another method of supporting the inclined edge of the window which has been offered to the trade is to form the window guides of sufficient depth to compensate for the distance the inclined edge travels away from the perpendicular during adjustment. The foregoing method is obviously objectionable especially when employed at the front corners of the vehicle since the deep channel guide members effect a blind spot and accordingly materially interfere with the vision.

The present invention contemplates the provision of relatively simple means for supporting the inclined edge of the window panel in any one of its adjusted positions and accomplishes this result with a construction possessing none of the objections hereinbefore set forth.

Other objects of the invention will be made more apparent as this description proceeds, especially when considered in connection with the accompanying drawings, wherein:

Figure 1 is a side elevational view of a portion of a vehicle body with certain parts broken away for the sake of clearness;

Figure 2 is a side elevational view partly in section of the construction shown in Figure 1;

Figure 3 is a cross sectional view taken on the line 3—3 of Figure 2;

Figure 4 is a view similar to Figure 2 showing a slightly modified form of construction;

Figure 5 is a fragmentary elevational view of the construction illustrated in Figure 4 showing the glass panel in its uppermost position;

Figure 6 is a view similar to Figure 2 showing still another modified form of construction; and Figure 7 is a fragmentary side elevational view of the construction shown in Figure 6 illustrating the window panel in its uppermost position.

Referring now to the drawings, it will be noted that there is illustrated in Figure 1 a portion of a vehicle body 10 comprising a polygonal frame 11 having a window opening 12 in the upper end thereof and having side panels 13 secured to the outer and inner sides thereof forming a housing 14 for receiving the slidable glass panel 15 and the window operating mechanism 16 which may be of any suitable construction and accordingly, further reference to the same will not be made herein. The polygonallyshaped frame 11 comprises a rear frame member 17 arranged substantially perpendicular to the horizontal and a front frame member 18 inclined upwardly and rearwardly from the horizontal and connected at the upper and lower ends thereof to the corresponding ends of the frame member 17 by means of the parallel top and bottom frame members 19 and 20, respectively. Arranged within the boundaries of the frame 11 and rigidly secured to the inner surfaces of the frame members 17, 18 and 19 is a second frame 21 which is preferably substantially channel-shaped in cross-section and serves as a guide for the glass panel 15.

In detail, the frame 21 is provided with a front portion 22 inclined at an angle coincident to the inclination of the frame member 18 and connected to the rear portion 23 by means of the downwardly opening channel portion 24 which serves to receive the upper edge of the glass panel when the latter is in its uppermost position. As will be obvious from the preceding description, the window opening 12 is polygonal in shape having the front side edge inclined upwardly and rearwardly from the horizontal and in order to provide an efficient construction, the window panel 15 is identical in shape. Thus, it will be seen that since both the window opening and window are provided with correspondingly inclined front edge portions and since the glass panel is moved in a substantially perpendicular path, the front edge of the glass panel will travel away from the corresponding edge of the opening when the panel is moved from its closed position to its open position. The extent of movement of the front edge of the glass panel away from the adjacent edge of the window opening depends entirely upon the inclination of the front frame member 18 which in order to give the desired effect is usually relatively great and owing to the fact that the depth of the channel portion 22 is limited in order to obtain maximum vision, the forward edge of the glass panel usually moves completely out of the channel during the travel thereof from closed to open position. Movement of the front edge of the glass panel out of the channel portion 22 of the frame is obviously objectionable since it leaves the front portions of the glass panel unsupported and as a consequence, the latter has a tendency to rattle.

In order to rigidly support the forward edge of the glass panel irrespective of its position relative to the channel portion 22, I provide means carried by the glass panel and normally yieldably urged into engagement with the channel 22. The means employed in Figures 1 to 3, inclusive, comprises an inwardly opening channel member 25 of such dimension as to slidably engage within the channel portion 22 and to receive the forward edge of the glass panel 15 when the latter is in its uppermost position. The ends of the channel member 25 extend beyond the top and bottom edges of the glass panel and have secured thereto the rods 26 which extend rearwardly from the opposite ends of the channel member 25 longitudinally of the top and bottom edges of the glass panel. The rods 26 are slidably received in a pair of frame members 27 which are permanently secured to the top and bottom edges of the glass panel 15 and are urged forwardly by means of suitable coil springs 28 located within the frame members 27 in rear of the rods 26. The construction is such that the channel member 25 is yieldably urged into engagement with the channel portion 22 by means of the rods 26 and the springs 28 engaging the rods, and since the rods and channel member are carried directly by the glass panel 15, the forward edge of the latter will be effectively braced in any one of its positions.

The modified form of construction illustrated in Figures 4 and 5 differs from the foregoing arrangement in that only the upper portion of the frame member 29 is inclined rearwardly and the lower portion 30 thereof is substantially perpendicular or parallel to the rear frame member 31. Consequently, the channel-shaped bracing member 32 for the front edge of the glass panel, which may be identical in construction to the channel-shaped brace 25, must be capable of swinging movement so as to adjust itself to the different angularly-arranged portions of the window guide 33. The foregoing is accomplished by pivotally connecting the forward ends of the rods 34 with the upper and lower ends of the brace 32, so as to permit sliding movement of the rods 34 relative to each other. The manner in which the rods are assembled upon the window panel is identical to the construction, hereinbefore described, with the exception that the lowermost rod 34 is not actuated by a spring, but on the other hand is capable of unobstructed sliding movement in either direction. The arrangement is such as to prevent the guide member 32 from binding or otherwise interfering with the operation of the glass panel when the latter is lowered to a position below the inclined portion of the window guide.

The modification illustrated in Figures 6 and 7 differs from the construction illustrated in Figures 4 and 5 in that the rods 34 are elminated and the brace 35 for the front edge of the glass panel is provided with a rearwardly extending channel-shaped portion 36 adapted to slidably receive the upper front corner of the glass panel, and is normally maintained in engagement with the channel guide 37 by means of a coil spring 38 carried by the window frame 39 and secured to the brace 35 below the pivotal connection 40 of the brace to the window frame 39. The foregoing construction is such that as the forward edge of the glass panel moves away from the channel guide 37, the brace 35 moves forwardly into firm engagement with the channel guide 37 and since the brace is carried by the front edge of the window panel, it follows that the latter will be effectively braced in any one of its adjusted positions.

While in describing the present invention particular stress has been placed upon the association of my improved window bracing means in connection with a vehicle body construction having a window opening provided with an inclined side portion, it is to be noted that the same may be used with equal facility in connection with various other types of construction for effecting the bracing action of the glass panel, and accordingly reservation is made to make such changes in the construction as may come within the purview of the accompanying claims.

What I claim as my invention is:

1. A vehicle body provided with a window opening comprising a rigid frame having its vertical sides diverging, a vertically sliding glass panel having diverging vertical edges adapted to close the opening between the vertical sides of said frame, and extensible means projecting beyond one vertical edge of said glass panel and engaging one vertical side of said frame to prevent lateral edgewise movement of the glass panel when lowered.

2. A vehicle body provided with a window opening comprising a rigid frame having its vertical sides diverging, a vertically sliding glass panel having diverging vertical edges adapted to close the opening between the vertical sides of said frame, and extensible means projecting beyond one vertical edge of said glass panel and engaging the adjacent vertical edge of said frame to maintain the opposite edge of the glass panel in engagement with the opposite vertical frame member as the panel is lowered.

3. A vehicle body having a window opening comprising a rigid frame including a pair of diverging vertical side members formed of inwardly opening substantially channel-shaped members, and a panel member vertically slideable in said channel-shaped members to close said window opening, said panel including a laterally extensible portion engaging one of said channel-shaped members, for the purpose set forth.

In testimony whereof I affix my signature.

ALBERT P. BALL.